UNITED STATES PATENT OFFICE.

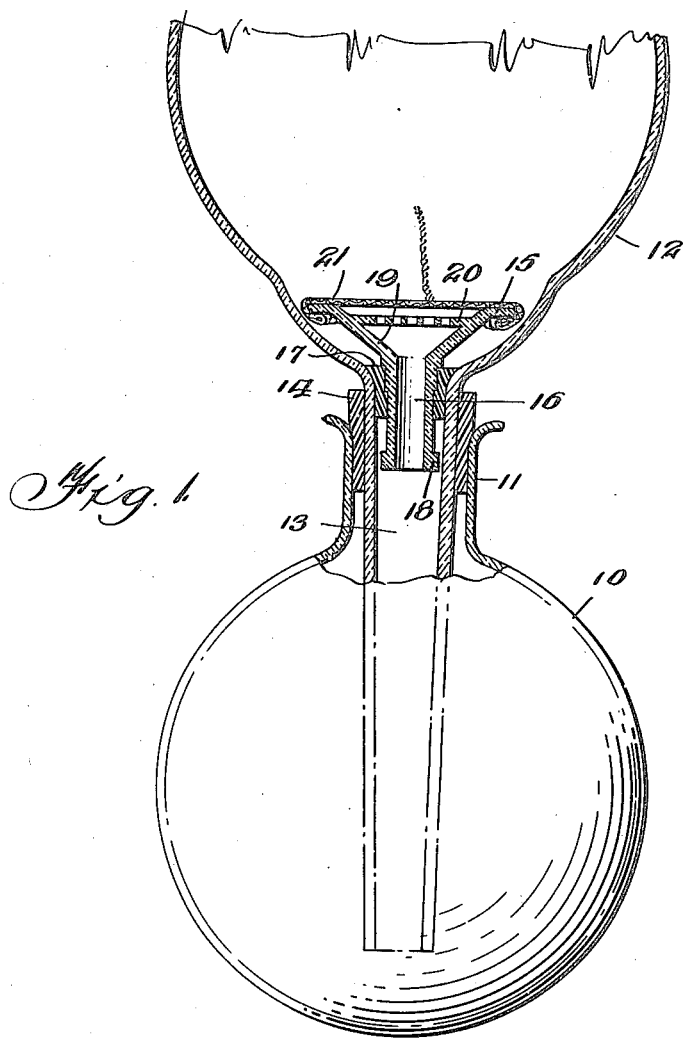

JACOB B. BLEICHRODE, OF BROOKLYN, NEW YORK, ASSIGNOR TO CRYSTAL PERCOLATOR COMPANY, INC., OF NEW YORK, N. Y., A CORPORATION OF NEW YORK.

PERCOLATOR-STRAINER.

1,167,259.

Specification of Letters Patent.

Patented Jan. 4, 1916.

Application filed May 5, 1915. Serial No. 26,040.

*To all whom it may concern:*

Be it known that I, JACOB B. BLEICHRODE, a citizen of the United States, residing at Brooklyn, in the county of Kings and State of New York, have invented certain new and useful Improvements in Percolator-Strainers; and I do hereby declare the following to be a full, clear, and exact description of the invention, such as will enable others skilled in the art to which it appertains to make and use the same.

This invention relates to percolator strainers and more particularly to the provision of a strainer for a percolator in which all parts thereof subjected to the action of coffee are of nonmetallic substance.

An object of this invention is to provide a removable strainer for a percolator, making provision for the attachment of a strainer cloth to said strainer.

A further object of this invention is the provision of a stem having a resilient band carried thereby for insertion in the neck of the spout of a funnel.

A further object of this invention is the provision of a strainer of compact design of a vitreous material or porcelain.

Further objects will be apparent from the following specification, appended claims and drawings thereof, in which—

Figure 1 is a vertical sectional view through parts of a percolator showing the strainer in section and Fig. 2 is a plan view of the strainer removed.

In percolators of this type, it is desirous to have all parts thereof which are subject to the action of the coffee of nonmetallic substances so as not to affect the coffee through any chemical reaction.

Referring to the drawings showing this strainer, 10 indicates an urn in which a volume of water is placed, and said urn having a neck 11 formed thereon. A funnel 12 has a spout 13 depending through the neck of the urn and said spout having a resilient sleeve 14 carried thereby to form an air-tight joint between said spout and the neck of the urn. A strainer having an enlarged top portion 15 is removably carried by the neck of the spout 13 in having the hollow stem 16 extend through the neck of the spout and in having a resilient sleeve 17 mounted on the exterior of said stem. The lower end of said stem has a bead 18 formed thereon to withdraw the sleeve 17 in the removal of the strainer. The upper portion of the strainer comprises a flaring bowl 19 which has the perforated diaphragm 20 formed therein. The edge at the top is slightly raised above the diaphragm 20 so that when the strainer cloth 21 is placed about the top of the strainer, there will be a space between the strainer cloth and the diaphragm 20 to permit an accumulation of liquid which may pass through the perforations in the diaphragm without permitting the strainer cloth to contact with the diaphragm and clog the passages therethrough.

Modifications may be made within the scope of this invention without departing from the spirit thereof and the drawings are submitted for illustrative purposes only.

Having thus described my invention, I claim:

1. In a strainer of the class described, in combination with a funnel, a strainer insertible in the spout of said funnel, said strainer having a reduced depending stem, a resilient sleeve carried by said stem for engagement in the spout of said funnel, said strainer having a flaring upper end, a perforated diaphragm carried by the upper end of said strainer, the upper edge of said strainer being raised above the perforated diaphragm and a strainer cloth detachably secured to the upper end of said strainer.

2. In a strainer of the class described, a funnel, a strainer detachably secured in said funnel, said strainer being of a nonmetallic substance, said strainer having a reduced stem for insertion in the spout of the funnel, a retaining ring formed on the lower end of said reduced stem, a resilient sleeve carried by said stem above said retaining ring for frictional contact with the walls of the spout of said funnel, said strainer having a flaring bowl, a flange extending from the edge of the top of said bowl, a strainer cloth across said bowl having its edges gathered under said flange, said strainer cloth being stretched taut across said bowl and a perforated diaphragm across said bowl in spaced relation to said strainer cloth to afford an interval of space between said diaphragm and strainer cloth.

In testimony whereof I affix my signature in presence of two witnesses.

JACOB B. BLEICHRODE.

Witnesses:
HARRY C. ADAMS,
KARL POLL.